United States Patent
Tahk

(10) Patent No.: US 7,719,561 B2
(45) Date of Patent: May 18, 2010

(54) OPTICAL MEMBER COUPLING DEVICE AND OPTICAL SCANNING APPARATUS

(75) Inventor: Gyung Mo Tahk, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/113,378

(22) Filed: May 1, 2008

(65) Prior Publication Data

US 2009/0003881 A1 Jan. 1, 2009

(30) Foreign Application Priority Data

Jun. 27, 2007 (KR) ................. 10-2007-0063613

(51) Int. Cl.
*B41J 15/14* (2006.01)
*B41J 27/00* (2006.01)
(52) U.S. Cl. ................. 347/242; 347/257
(58) Field of Classification Search ........... 347/230, 347/241, 242, 244, 256–257; 359/808, 811, 359/819–820
See application file for complete search history.

(56) References Cited

U.S. PATENT DOCUMENTS

| | | | |
|---|---|---|---|
| 5,155,616 A | 10/1992 | Yamaguchi et al. | |
| 5,249,073 A | 9/1993 | Takizawa et al. | |
| 5,864,739 A * | 1/1999 | Kaneko et al. | 399/220 |
| 6,411,325 B1 * | 6/2002 | Matsushita et al. | 347/257 |
| 2008/0273254 A1 * | 11/2008 | Park | 359/811 |

FOREIGN PATENT DOCUMENTS

| | | |
|---|---|---|
| CN | 2104990 | 5/1992 |
| DE | 41 13 956 | 11/1992 |
| DE | 198 48 942 | 5/2000 |
| GB | 2 295 029 | 5/1996 |
| JP | 2002277782 A * | 9/2002 |
| JP | 2004-133073 | 4/2004 |

OTHER PUBLICATIONS

European Search Report dated Oct. 14, 2008 issued in EP 08157867.6.
Chinese Office Action issued Aug. 21, 2009 in CN Application No. 2008101092804.

* cited by examiner

*Primary Examiner*—Hai C Pham
(74) *Attorney, Agent, or Firm*—Stanzione & Kim, LLP

(57) ABSTRACT

An optical scanning apparatus includes a light source to generate a beam, a lens to transmit the beam generated from the light source, and a base member to which the lens is fixed, wherein the lens is fixed to the base member via a mount member having a same coefficient of thermal expansion as the lens. According to the present general inventive concept, an optical member, such as the lens, is not directly joined to the base member but is joined to the mount member having the same coefficient of thermal expansion as the optical member and is then coupled to the base member. Consequently, the optical member is stably coupled to the base member even when the temperature changes.

26 Claims, 8 Drawing Sheets

OPTICAL MEMBER COUPLING DEVICE AND OPTICAL SCANNING APPARATUS

CROSS-REFERENCE TO RELATED APPLICATIONS

This application claims priority under 35 U.S.C. §119(a) from Korean Patent Application No. 2007-63613, filed on Jun. 27, 2007 in the Korean Intellectual Property Office, the disclosure of which is incorporated herein in its entirety by reference.

BACKGROUND OF THE INVENTION

1. Field of the Invention

The present general inventive concept relates to an optical member coupling device, and, more particularly, to an optical member coupling device that is capable of stably maintaining the coupling state of an optical member, coupled to a coupling position by an adhesive, even when the optical member contracts or expands due to the temperature change, and an optical scanning apparatus including the same.

2. Description of the Related Art

Generally, an optical scanning apparatus is used in an electro-photographic image forming machine to scan a beam to a photoconductor, according to an image signal, such that an electrostatic latent image is formed on the photoconductor. The optical scanning apparatus includes a light source to generate a beam according to an image signal, a collimator lens that converts the beam, generated from the light source, into a beam parallel to an optical axis, i.e., a collimated beam, a cylindrical lens that converts the collimated beam into a beam parallel to a sub-scanning direction, i.e., a linear beam, a polygon mirror to deflect the linear beam within a specific angle range, and an F-theta lens that converges the beam, reflected by the polygon mirror, to the surface of a photoconductor. These components are mounted to a single base member to constitute a single module.

In order to precisely form an electrostatic latent image on the photoconductor according to an image signal, the optical members, such as the collimator lens, the cylindrical lens, the polygon mirror, and the F-theta lens, must be accurately and securely mounted to a housing. Also, the change in installation position of the optical members due to environmental factors, such as the temperature change, must be prevented.

Typically, the optical members may be coupled to the housing a coupling member, such as a screw, or an adhesive. The coupling method using the coupling member, such as a screw increases the number of components, with the result that the manufacturing costs of the optical scanning apparatus increases, and the weight of the optical scanning apparatus also increases.

A coupling method using an adhesive is described in Japanese Patent Application Publication No. 2004-133073 (published Apr. 30, 2004), which provides an optical apparatus constructed in a structure in which a glass substrate is coupled using an adhesive.

In the described optical apparatus, four corners of a rectangular glass substrate are joined to a spacer by a high-elasticity adhesive, such that the glass substrate is coupled to the spacer, and a low-elasticity adhesive is applied to the edge of the glass substrate such that the glass substrate is joined to the spacer.

In the conventional optical apparatus, however, the coefficient of the thermal expansion of the glass substrate is different from that of the spacer, made of resin. Consequently, when the temperature changes, excessive thermal stress occurs at the interface between the glass substrate and the spacer, with the result that the glass substrate becomes separated from the spacer.

SUMMARY OF THE INVENTION

The present general inventive concept provides an optical member coupling device that is capable of stably maintaining the coupling state of an optical member, coupled to a coupling position by an adhesive, even when the optical member contracts or expands due to the temperature change, and an optical scanning apparatus including the same.

Additional aspects and/or utilities of the present general inventive concept will be set forth in part in the description which follows and, in part, will be obvious from the description, or may be learned by practice of the general inventive concept.

The foregoing and/or other aspects of the general inventive concept may be achieved by providing an optical scanning apparatus including a light source to generate a beam, a lens to transmit the beam generated from the light source, and a base member to which the lens is fixed, where the lens is fixed to the base member via a mount member.

The lens may be attached to the mount member by an adhesive.

The mount member may have an adhesive receiving groove having an interior, where the application area of the adhesive comprises the interior of the adhesive receiving groove.

The adhesive may have a coefficient of thermal expansion greater than that of the lens.

The base member may have a location groove having a size greater than that of the mount member, and where a mount member is coupled in the location groove such that the edge of the mount member is spaced apart from the base member.

The base member or a mount member may have a coupling protrusion, and the mount member or the base member may have a receiver coupling, in which the coupling protrusion is forcibly fitted.

The base member may have a location groove having a size greater than that of the mount member, the mount member is coupled in the location groove such that the edge of the mount member is spaced apart from the base member, the coupling protrusion is formed at the mount member, and the receiver coupling is formed at the center of the location groove.

The mount member may have the same coefficient of thermal expansion as the lens.

The mount member may be made of the same material as the lens.

The lens can be an F-theta lens that converges the beam, generated from the light source, to a photoconductor disposed outside the base member.

The foregoing and/or other aspects of the general inventive concept may also be achieved by providing a coupling device to couple an optical member to a base member in an optical system, the coupling device including a mount member, where the optical member is fixed to the base member via the mount member.

The foregoing and/or other aspects of the general inventive concept may also be achieved by providing an optical scanning apparatus, the apparatus including a light source to generate a beam, a reflecting mirror disposed on a first side of the optical scanning apparatus to reflect the generated beam to a second side of the optical scanning apparatus, and a lens unit to converge the reflected beam to a surface of a photoconductor, where the lens unit is fixed to a base member via a mount member, and the lens unit and the mount member have a same coefficient of thermal expansion.

The lens unit may be made of the same material as the mount member.

The lens unit may be fixed to the mount member with an adhesive.

The adhesive can have a coefficient of thermal expansion that is greater than the coefficient of thermal expansion of the lens unit and the mount member.

The mount member may be configured to control the thermal expansion of the adhesive.

The mount member may be fixed to the base member via a coupler, where the coupler maintains a coupling between the mount member and base member as temperature changes.

The base member has a location groove having a size greater than that of the mount member, and the mount member may be coupled in the location groove such that the edge of the mount member is spaced apart from the base member.

The base member or the mount member may have a coupling protrusion, and the mount member or the base member may have a receiver coupling, in which the coupling protrusion is forcibly fitted.

The base member may have a location groove having a size greater than that of the mount member, the mount member is coupled in the location groove such that the edge of the mount member is spaced apart from the base member, the coupling protrusion may be formed at the mount member, and the receiver coupling may be formed at the center of the location groove.

The foregoing and/or other aspects of the general inventive concept may also be achieved by providing a coupling device to couple an optical member in an optical system, the coupling device including a mount member, where the optical member is fixed to the mount member, and where the optical member has a same coefficient of thermal expansion as the mount member.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Figure 1:
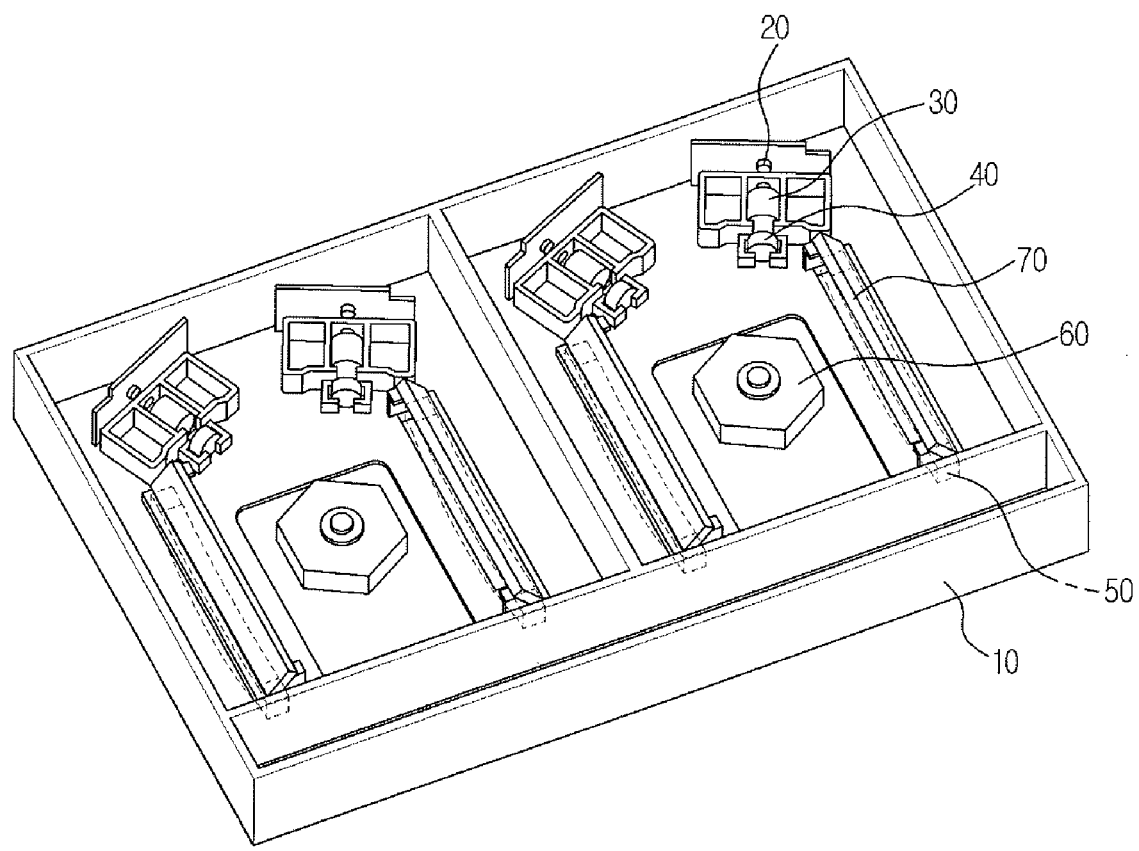
FIGS. 1 and 2 are perspective views schematically illustrating an optical scanning apparatus according to an embodiment of the present general inventive concept.

Reference will now be made in detail to the embodiment of the present general inventive concept, examples of which are illustrated in the accompanying drawings, wherein like reference numerals refer to like elements throughout. The embodiment is described below to explain the present general inventive concept by referring to the figures.

Figure 2:
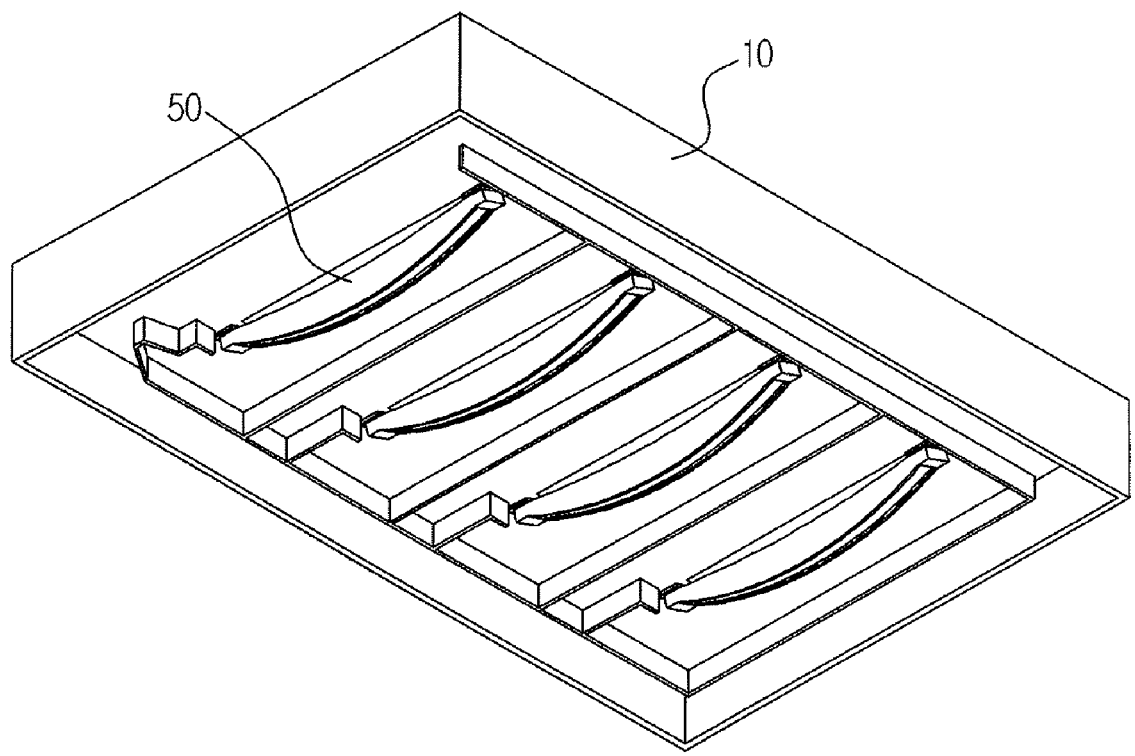

Referring to FIGS. 1 and 2, a optical scanning apparatus according to an embodiment of the present general inventive concept includes a base member 10, a light source 20 coupled to the base member 10 to generate a beam, a plurality of lenses 30, 40, and 50 coupled to the base member 10 to converge the beam generated from the light source 20, and a polygon mirror 60 rotatably coupled to the base member 10 to deflect the beam generated from the light source 20.

As illustrated in FIG. 1, the light source 20, the first and second lenses 30 and 40, and the polygon mirror 60 are located at one side of the base member 10. As illustrated in FIG. 2, the third lens 50 is located at the other side of the base member 10.

When a beam is generated from the light source 20, the beam passes through the first and second lenses 30 and 40. The beam, having passed through the second lens 40, is deflected within an angle range by the polygon mirror 60, rotating at a high speed. The deflected beam is reflected by a reflection mirror 70, mounted at one side of the base member 10, with the result that the beam is directed to the other side of the base member 10. After that, the beam passes through the third lens 50, and is then forwarded to a photoconductor (not illustrated).

The first lens 30 is a collimator lens that converts the beam, generated from the light source 20, into a beam parallel to an optical axis, i.e., a collimated beam. The second lens 40 is a cylindrical lens that converts the collimated beam into a beam parallel to a sub-scanning direction, i.e., a linear beam. The third lens 50 is an F-theta lens that converges the beam, reflected by the polygon mirror 60, to the surface of the photoconductor.

Figure 3:
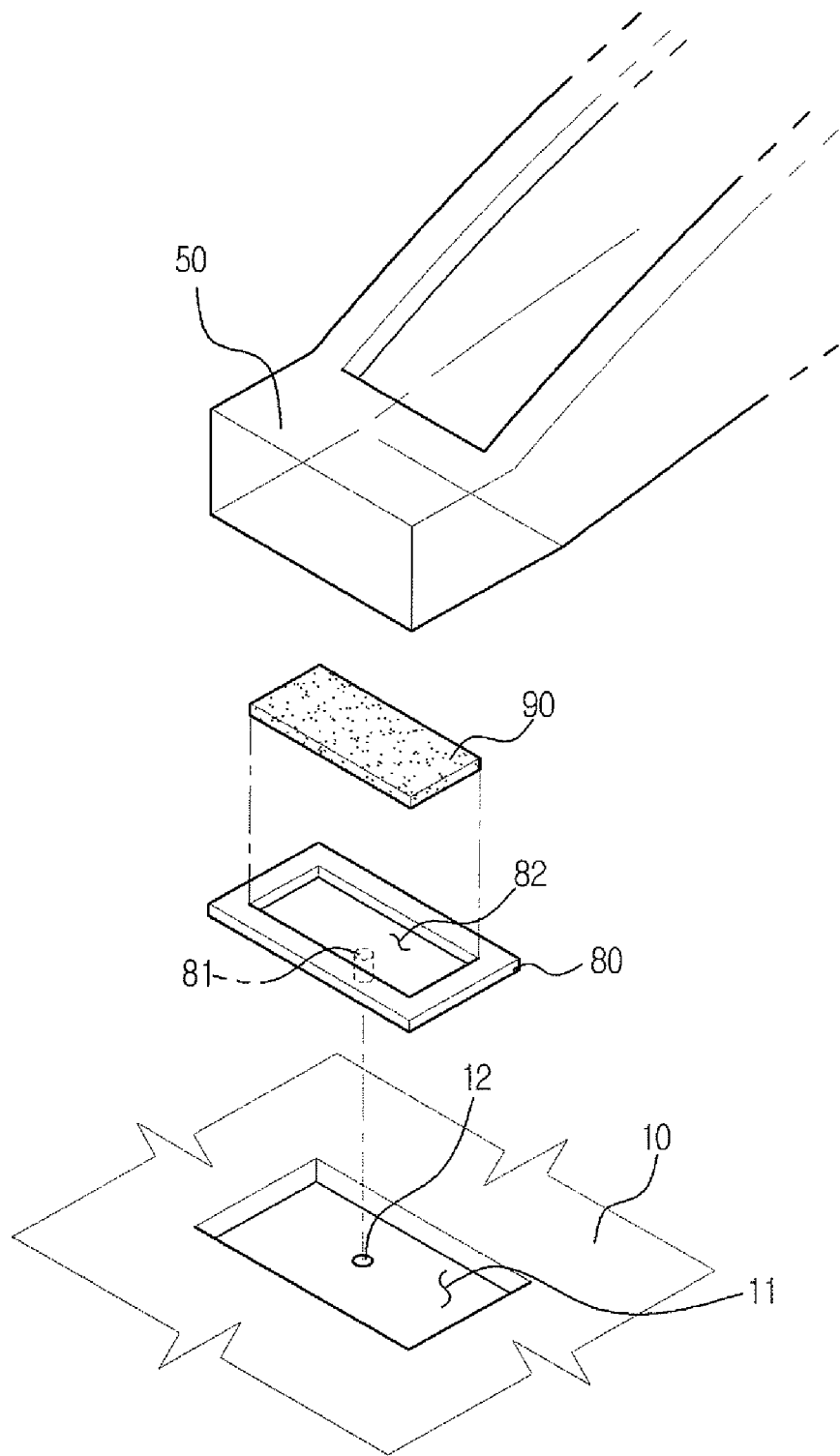
FIG. 3 is an exploded perspective view illustrating a coupling device to couple a third lens illustrated in FIG. 2 to a base member.

The third lens 50 is an aspheric lens having a curvature. As illustrated in FIGS. 2 and 3, opposite ends of the third lens 50 are joined to the other side of the base member 10 by an adhesive 90. To the base member 10 is coupled a mount member 80 to couple the third lens 50 to the base member 10. The third lens 50 is fixed to the base member 10 via the mount member 80.

Figure 4:
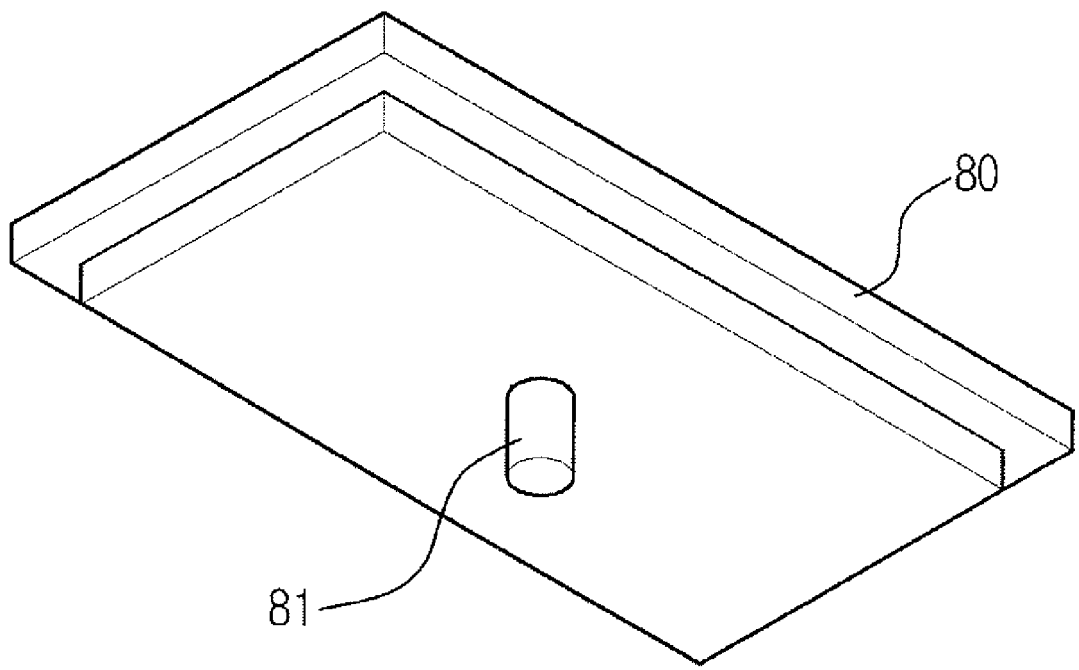
FIG. 4 is a bottom perspective view schematically illustrating a mount member depicted in FIG. 3.

As illustrated in FIG. 3, the mount member 80 is coupled in a location groove 11 formed at the other side of the base member 10. The location groove 11 can be formed in the shape of a rectangle having a size greater than that of the mount member 80, which can also be formed in the shape of a rectangle. The location groove 11 is provided at the center thereof with a coupling hole 12. As illustrated in FIGS. 3 and 4, the mount member 80 has a coupling protrusion 81, which is forcibly fitted in the coupling hole 12, and an adhesive receiving groove 82 to receive an adhesive 90. The coupling protrusion 81 protrudes from the center of the bottom of the mount member 80. The adhesive receiving groove 82 is formed at the top of the mount member 80 in the same shape as the mount member 80. The adhesive 90 has fluidity before solidification. For this reason, when the adhesive 90 is received in the adhesive receiving groove 82, the application area of the adhesive 90 generally includes at least a portion of the interior of the adhesive receiving groove 82. Consequently, the adhesive application is easily and smoothly performed.

The adhesive 90 has a coefficient of thermal expansion greater than that of the base member 10. For this reason, when the temperature rises, the adhesive 90 expands more than the base member 10. However, the adhesive 90 is received in the adhesive receiving groove 82, and therefore, the application area of the adhesive 90 generally includes at least a portion of the interior of the adhesive receiving groove 82, with the result that the expansion of the adhesive 90 is controlled when the temperature rises.

The mount member 80 has a function to control the thermal expansion of the adhesive 90 and to adjust the thickness of the adhesive attached to the third lens 50 without an additional member. Specifically, the thickness of the adhesive 90, attached to the third lens 50, is adjusted to change a natural frequency of the third lens 50, thereby preventing the occurrence of a resonance phenomenon of the third lens 50 due to the high-speed rotation of the polygon mirror 60. In the conventional art, it was difficult to adjust the thickness of the adhesive 90. According to the present general inventive concept, however, the depth of the adhesive receiving groove 82 of the mount member 80 is changed to easily adjust the thickness of the adhesive 90.

The base member 10 may be made of polycarbonate (PC), and an ultraviolet-curing adhesive may be used as the adhesive 90. According to the present general inventive concept, however, the material of the base member 10 and the type of the adhesive are not limited to the above-specified ones.

The shape of the location groove 11, the mount member 80, and the adhesive receiving groove 82 may be formed in various different shapes in addition to the rectangle.

Also, the coupling protrusion 81 of the mount member 80 and the coupling hole 12, in which the coupling protrusion 81 is fitted, may be formed in various different shapes, such as a polygon, in addition to the circle.

Figure 5:
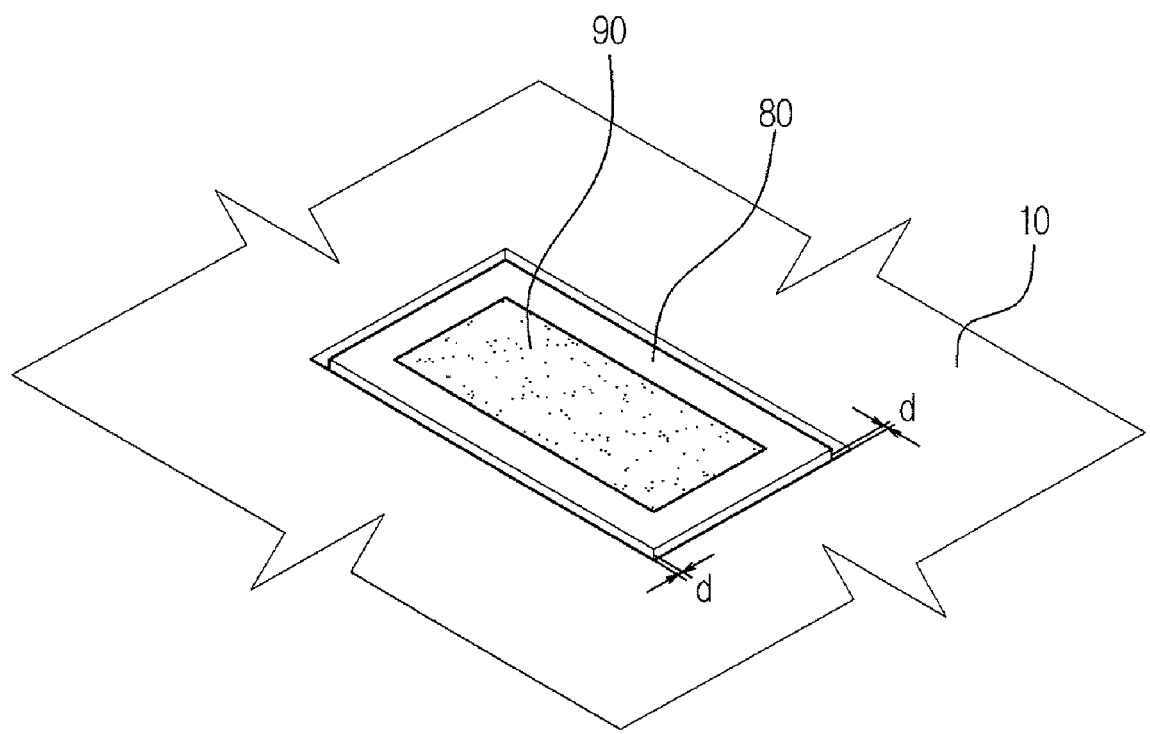
FIG. 5 is a perspective view illustrating the coupling of the mount member depicted in FIG. 3 to the base member.

The mount member 80 is coupled to the center of the location groove 11 by the insertion of the coupling protrusion 81 into the coupling hole 12 of the location groove 11. The size of the mount member 80 is less than that of the location groove 11. Consequently, when the mount member 80 is coupled to the center of the location groove 11, as illustrated in FIG. 5, the edge of the mount member 80 is spaced apart from the base member 10 by a distance "d". Since there is a space around the mount member 80, as described above, the mount member 80 can easily expand without interference with the base member 10, when the temperature rises.

The mount member 80 is made of the same material as the third lens 50. Generally, an F-theta lens is formed by injection molding of an olefin-based resin. Accordingly, the mount member 80 is also made of an olefin-based resin. As the mount member 80 is made of the same material as the third lens 50, the mount member 80 has the same coefficient of thermal expansion as the third lens 50. Consequently, when the temperature rises, the mount member 80 has an expansibility similar to that of the third lens 50. Also, when the temperature falls, the mount member 80 has a contractibility similar to that of the third lens 50. Since the change degrees of the third lens 50 and the mount member 80 due to the temperature change are similar to each other, as described above, thermal stress at the interface between the third lens 50 and the mount member 80 does not greatly increase, when the temperature changes, whereby the joining of the third lens to the mount member 80 is satisfactorily maintained.

In the present general inventive concept, the material of the mount member 80 is not limited to the olefin-based resin. When the material of the third lens 50 is changed, the mount member 80 may be made of the same material as the changed material of the third lens 50. Also, the material of the mount member 80 is usually the same as that of the third lens 50. However, the mount member 80 may be made of a different material having the same coefficient of thermal expansion as the third lens 50.

Hereinafter, the coupling of the third lens 50 to the base member 10 will be described with the accompanying drawings. Opposite ends of the third lens 50 are coupled to the base member 10. Since the coupling between the third lens 50 and the base member 10 at one end of the third lens 50 is similar to the coupling between the third lens 50 and the base member 10 at the other end of the third lens 50, only the coupling between the third lens 50 and the base member 10 at one end of the third lens 50 will be described below.

Figure 6:
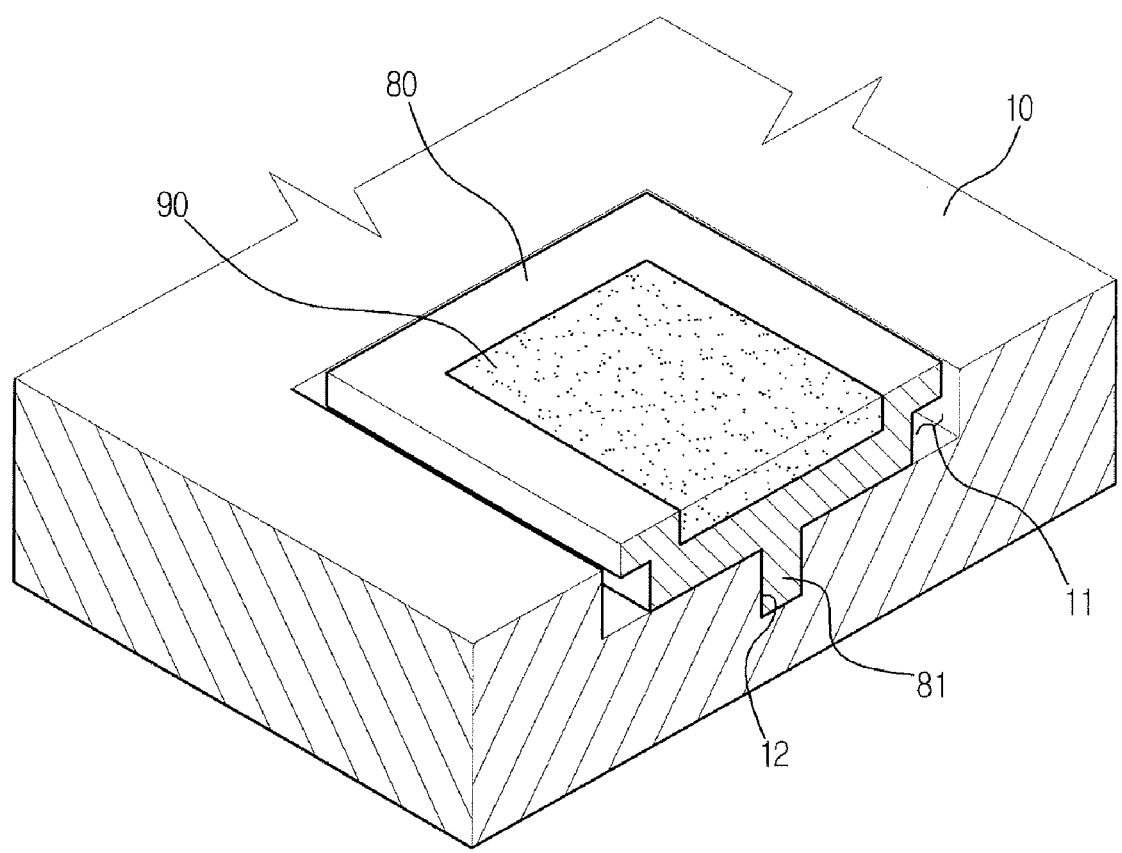
FIG. 6 illustrate a sectional view of the base member and the mount member illustrated in FIG. 5.

First, the coupling protrusion 81 of the mount member 80 is inserted into the coupling hole 12 of the base member such that the mount member 80 is coupled in the location groove 11. When the mount member 80 is located at the center of the location groove 11, as illustrated in FIGS. 5 and 6, the edge of the mount member 80 is spaced a predetermined distance d from the base member 10, with the result that a space is formed around the mount member 80.

Subsequently, the adhesive 90 is applied to the adhesive receiving groove 82 of the mount member 80. At this time, the amount of the adhesive 90 applied is appropriately controlled such that the adhesive 90 is filled to a height approximately equal to the surface height of the mount member 80 while the adhesive 90 uniformly spreads throughout the adhesive receiving groove 82.

Figure 7:
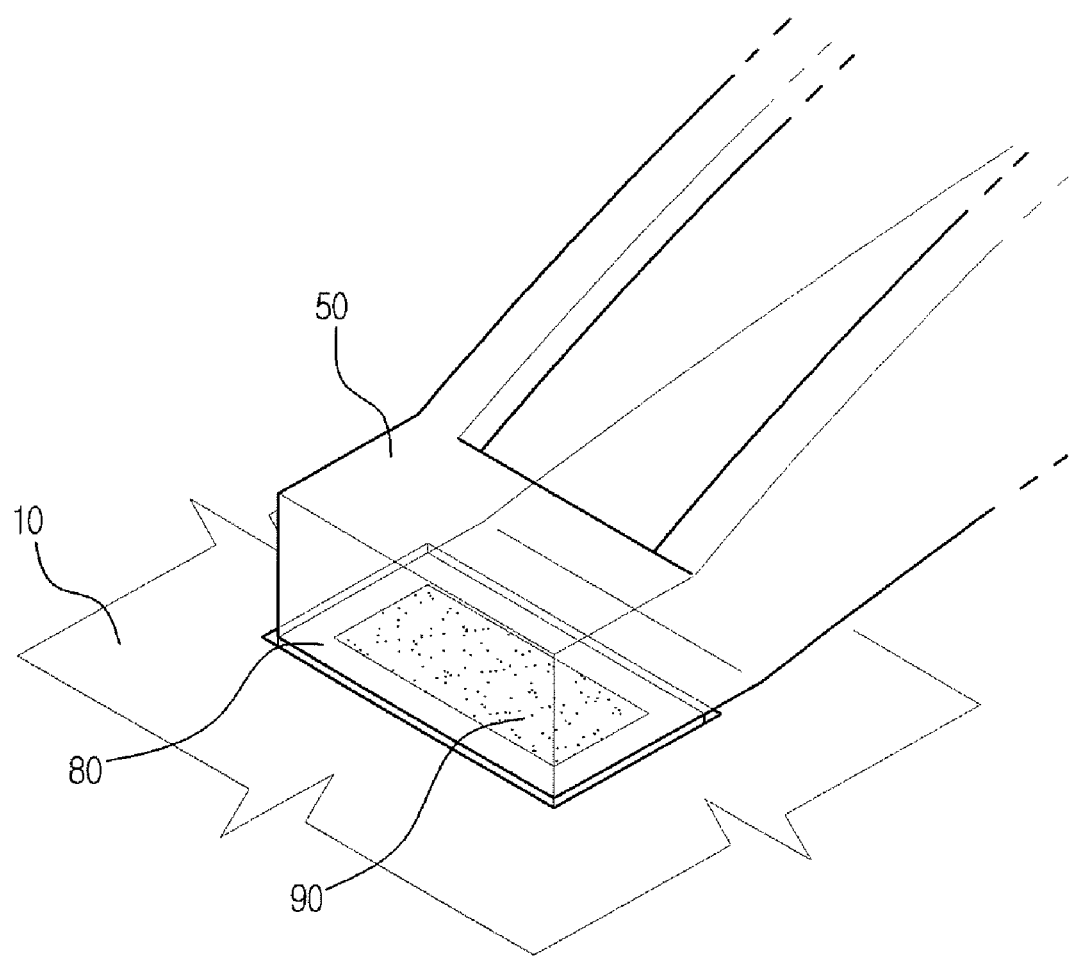
FIG. 7 is a perspective view illustrating the third lens joined to the mount member illustrated in FIG. 5.
Figure 8:
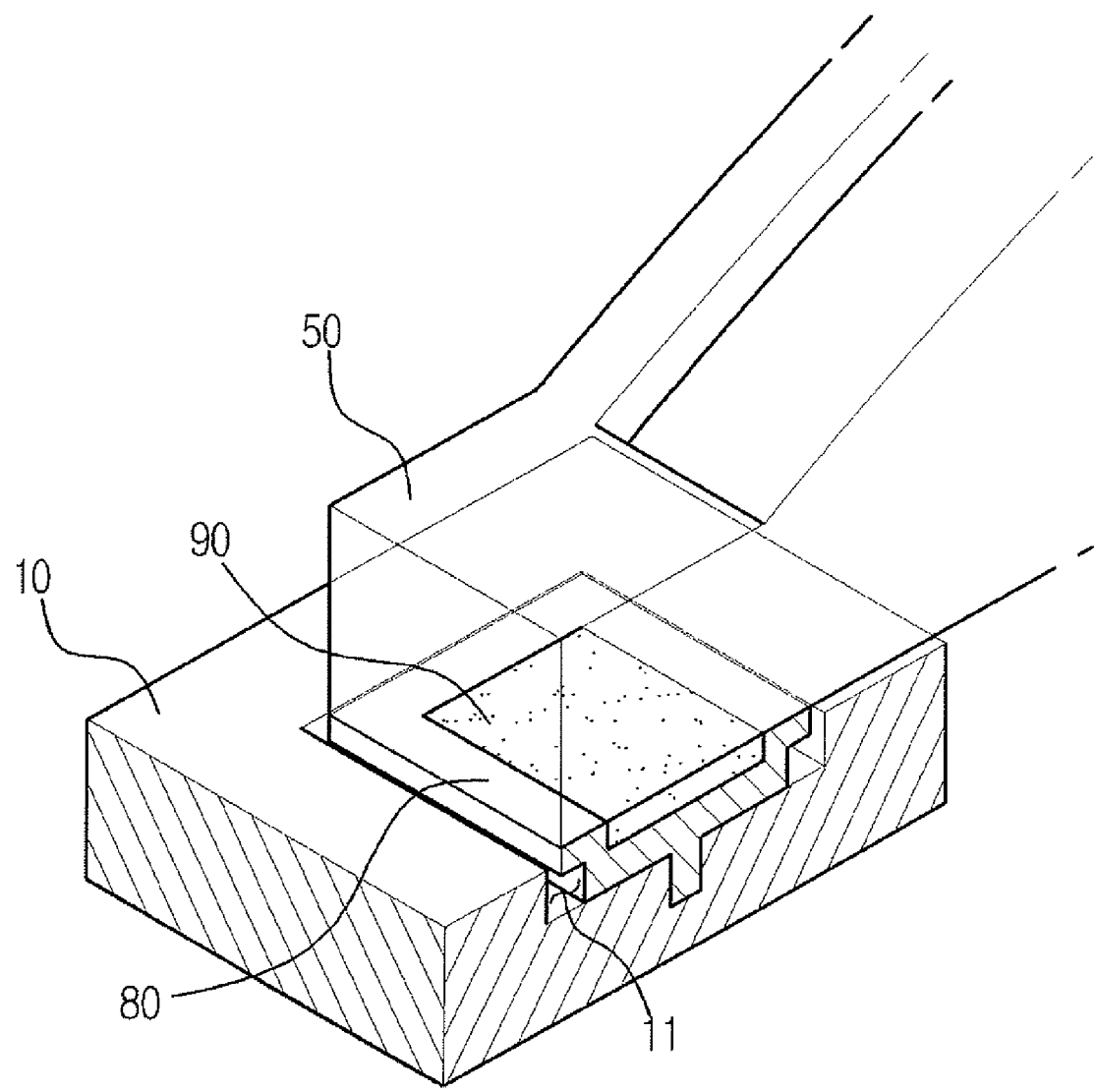
FIG. 8 illustrates a sectional view of the base member, mount member, and the third lens depicted in FIG. 7.

After the adhesive 90 is applied such that the adhesive 90 does not overflow the adhesive receiving groove 82 of FIG. 3, as illustrated in FIGS. 7 and 8, ultraviolet rays are irradiated on the area where the adhesive 90 is applied while one end of the third lens 50 is positioned on the mount member 80. With the solidification of the adhesive 90, the third lens 50 sticks to the mount member 80, and therefore, the third lens 50 is securely coupled to the base member 10.

The above-described joining process is identically applied to the other side of the third lens 50. Specifically, the other end of the third lens 50 is coupled to the base member 10 via the mount member 80 having the same coefficient of thermal expansion as the third lens 50.

Since the third lens 50 is joined to the mount member 80 having the same coefficient of thermal expansion as the third lens 50 by the adhesive 90, as described above, the change degrees of the third lens 50 and the mount member 80 are similar, when the temperature changes, whereby thermal stress at the interface therebetween does not greatly increase. The adhesive 90, having a coefficient of thermal expansion greater than that of the third lens 50 or the mount member 80, is received in the adhesive receiving groove 82 of the mount member 80, thus controlling the general application area of the adhesive 90. Consequently, thermal stress at the interface between the adhesive 90 and the mount member 80 does not greatly increase even when the temperature changes.

Also, the coupling protrusion 81 of the mount member 80, to which the third lens 50 is joined, is forcibly fitted in the coupling hole 12 of the base member 10. As a result, the temperature change does not affect the coupling between the mount member 80 and the base member 10.

Consequently, the third lens 50 is stably coupled to the base member 10 even when the temperature changes.

In the above description, a detailed explanation of the coupling device to couple the third lens 50 of the optical scanning apparatus to the base member 10 was given to illustrate the optical member coupling device according to the present general inventive concept. However, the present general inventive concept may be applied to couple different optical members, such as the first and second lenses 30 and 40, and the reflection mirror 70, of the optical scanning apparatus.

Also, the present general inventive concept may be applied to couple an optical member of an optical apparatus different from the optical scanning apparatus.

As apparent from the above description, the optical member, such as the lens, is not directly joined to the base member but is joined to the mount member having the same coefficient of thermal expansion as the optical member and is then coupled to the base member according to the present general inventive concept. Consequently, the optical member is stably coupled to the base member even when the temperature changes.

Also, the coupling of the optical member to the base member is stably maintained even when the temperature changes, whereby the efficiency of an optical apparatus, such as an optical scanning apparatus, is improved.

Although a few embodiments of the present general inventive concept have been illustrated and described, it would be appreciated by those skilled in the art that changes may be made in this embodiment without departing from the principles and spirit of the general inventive concept, the scope of which is defined in the claims and their equivalents.

What is claimed is:

1. An optical scanning apparatus comprising:
a light source to generate a beam;
a lens to transmit the beam generated from the light source; and
a base member to which the lens is fixed,
wherein the lens is fixed to the base member via a mount member, and
wherein the base member has a location groove having a size greater than that of the mount member, and the mount member is coupled in the location groove such that the edge of the mount member is spaced apart from the base member.

2. The optical scanning apparatus according to claim 1, wherein the lens is attached to the mount member by an adhesive.

3. The optical scanning apparatus according to claim 2, wherein the mount member has an adhesive receiving groove having an interior, where the application area of the adhesive comprises the interior of the adhesive receiving groove.

4. The optical scanning apparatus according to claim 2, wherein the adhesive has a coefficient of thermal expansion greater than that of the lens.

5. The optical scanning apparatus according to claim 1, wherein the base member or the mount member has a coupling protrusion, and the mount member or the base member has a receiver coupling, in which the coupling protrusion is forcibly fitted.

6. The optical scanning apparatus according to claim 5, wherein the base member has a location groove having a size greater than that of the mount member, the mount member is coupled in the location groove such that the edge of the mount member is spaced apart from the base member, the coupling protrusion is formed at the mount member, and the receiver coupling is formed at the center of the location groove.

7. The optical scanning apparatus according to claim 1, wherein the mount member has the same coefficient of thermal expansion as the lens.

8. The optical scanning apparatus according to claim 7, wherein the mount member is made of the same material as the lens.

9. The optical scanning apparatus according to claim 1, wherein the lens is an F-theta lens that converges the beam, generated from the light source, to a photoconductor disposed outside the base member.

10. A coupling device to couple an optical member to a base member in an optical system, comprising:
a mount member; wherein
the optical member is fixed to the base member via the mount member,
wherein the base member has a location groove having a size greater than that of the mount member, and the mount member is coupled in the location groove such that the edge of the mount member is spaced apart from the base member.

11. The coupling device according to claim 10, wherein the optical member is attached to the mount member by an adhesive.

12. The coupling device according to claim 11, wherein the mount member has an adhesive receiving groove having an interior, wherein the application area of the adhesive comprises the interior of the adhesive receiving groove.

13. The coupling device according to claim 11, wherein the adhesive has a coefficient of thermal expansion greater than that of the optical member.

14. The coupling device according to claim 10, wherein the base member or the mount member has a coupling protrusion, and the mount member or the base member has a receiver coupling, in which the coupling protrusion is forcibly fitted.

15. The coupling device according to claim 14, wherein the base member has a location groove having a size greater than that of the mount member, the mount member is coupled in the location groove such that the edge of the mount member is spaced apart from the base member, the coupling protrusion is formed at the mount member, and the receiver coupling is formed at the center of the location groove.

16. The coupling device according to claim 10, wherein the mount member has the same coefficient of thermal expansion as the optical member.

17. The coupling device according to claim 16, wherein the mount member is made of the same material as the optical member.

18. An optical scanning apparatus, comprising:
a light source to generate a beam;
a reflecting mirror disposed on a first side of the optical scanning apparatus to reflect the generated beam to a second side of the optical scanning apparatus; and
a lens unit to converge the reflected beam to a surface of a photoconductor, wherein
the lens unit is fixed to a base member via a mount member, and the lens unit and the mount member have a same coefficient of thermal expansion, and
wherein the base member has a location groove having a size greater than that of the mount member, and the mount member is coupled in the location groove such that the edge of the mount member is spaced apart from the base member.

19. The optical scanning apparatus according to claim 18, wherein the lens unit is made of the same material as the mount member.

20. The optical scanning apparatus according to claim 18, wherein the lens unit is fixed to the mount member with an adhesive.

21. The optical scanning apparatus according to claim 20, wherein the adhesive has a coefficient of thermal expansion that is greater than the coefficient of thermal expansion of the lens unit and the mount member.

22. The optical scanning apparatus according to claim 20, wherein the mount member is configured to control the thermal expansion of the adhesive.

23. The optical scanning apparatus according to claim 18, wherein the mount member is fixed to the base member via a coupler, wherein the coupler is configured to maintain coupling between the mount member and base member as temperature changes.

24. The optical scanning apparatus according to claim 18, wherein the base member or the mount member has a coupling protrusion, and the mount member or the base member has a receiver coupling, in which the coupling protrusion is forcibly fitted.

25. The optical scanning apparatus according to claim 24, wherein the base member has a location groove having a size greater than that of the mount member, the mount member is coupled in the location groove such that the edge of the mount member is spaced apart from the base member, the coupling protrusion is formed at the mount member, and the receiver coupling is formed at the center of the location groove.

26. A coupling device to couple an optical member in an optical system, comprising:

a mount member; wherein the optical member is fixed to the mount member, and wherein the optical member has a same coefficient of thermal expansion as the mount member, and wherein a base member has a location groove having a size greater than that of the mount member, and the mount member is coupled in the location groove such that the edge of the mount member is spaced apart from the base member.

* * * * *